United States Patent

Fuziak, Jr.

(10) Patent No.: US 7,547,101 B2
(45) Date of Patent: *Jun. 16, 2009

(54) EYEGLASSES WITH INTEGRATED TELESCOPING VIDEO DISPLAY

(75) Inventor: Robert J. Fuziak, Jr., Jackson, WY (US)

(73) Assignee: Hind-Sight Industries, Inc., Jackson, WY (US)

( * ) Notice: Subject to any disclaimer, the term of this patent is extended or adjusted under 35 U.S.C. 154(b) by 201 days.

This patent is subject to a terminal disclaimer.

(21) Appl. No.: 11/619,144

(22) Filed: Jan. 2, 2007

(65) Prior Publication Data

US 2008/0158506 A1    Jul. 3, 2008

(51) Int. Cl.
*G02C 1/00* (2006.01)
(52) U.S. Cl. .................................. 351/158; 345/7
(58) Field of Classification Search ............... 351/158, 351/41, 111, 121; 348/207.1, 62, 42; 345/7, 345/8
See application file for complete search history.

(56) References Cited

U.S. PATENT DOCUMENTS

| | | | |
|---|---|---|---|
| 4,493,538 A | 1/1985 | Tolliver | |
| 5,886,822 A | 3/1999 | Spitzer | |
| 6,065,832 A * | 5/2000 | Fuziak | 351/50 |
| 6,073,033 A | 6/2000 | Campo | |
| 6,349,001 B1 | 2/2002 | Spitzer | |
| 7,048,370 B2 | 5/2006 | Starner et al. | |
| 7,310,072 B2 * | 12/2007 | Ronzani et al. | 345/8 |
| 7,325,922 B2 * | 2/2008 | Spivey | 351/159 |
| 2005/0237271 A1 | 10/2005 | Yamamoto | |
| 2008/0198324 A1* | 8/2008 | Fuziak | 351/158 |

OTHER PUBLICATIONS

International Search Report for PCT/US07/88844, International Searching Authority, Oct. 6, 2008, p. 1-10.
International Search Report for PCT/US08/070513, International Searching Authority, Nov. 7, 2008, p. 1-9.

* cited by examiner

*Primary Examiner*—Hung X Dang
(74) *Attorney, Agent, or Firm*—Samuel M. Freund; Cochran Freund & Young LLC (57) ABSTRACT

Eyeglasses including two video displays having a surface substantially equal in area to that of a lens of the eyeglasses, that may be pivoted forwardly and outwardly to an open position for viewing, and may be folded rearwardly and inwardly to a stored position for retention by the temple members of the eyeglasses when not in use, is described. Telescoping arms permit adjustment of the distance between the video displays and the lenses to suit a user. The video displays may be mildly concave in shape so that when in the closed position against the temple members, the eyeglasses present the appearance and function of conventional eyewear.

19 Claims, 9 Drawing Sheets

EYEGLASSES WITH INTEGRATED TELESCOPING VIDEO DISPLAY

FIELD OF THE INVENTION

The present invention relates generally to video displays and, more particularly, to eyeglasses suitable for viewing video signals while having the appearance and function of ordinary eyewear.

BACKGROUND OF THE INVENTION

As computer screens continue to be made smaller, many additional environments for their use become available. In "Next Stretch for Plastic Electronics" by Graham P. Collins, Scientific American, August 2004, pages 74-81, the commercial use of organic semiconductors for viewing screens is described. Further, in "Practical Nanotubes, Molecular-Scale Fabrication Points Toward Commercial Carbon Electronics" by J. R. Minkel, a high-definition television screen fabricated from a glass panel coated with a brushy array of nanotubes is described.

Eyeglasses having 2 LCD screens and earphones are available from Audio Outfitters; however, this eyewear cannot be used as optical glasses or sunglasses. MicroOptical Products provides a head-up viewer which may be detachably mounted to conventional eyewear for right or left eye viewing, while Ray 3D provides liquid crystal shutter glasses having clear optics designed to fit over prescription eyewear.

U.S. Pat. No. 4,806,011 for "Spectacle-Mounted Ocular Display Apparatus" which issued to David s. Bettinger on Feb. 21, 1989 describes a spectacle-mounted display apparatus in which a reflective surface of a partially-transparent eyeglasses lens is employed as the primary optical element which, in cooperation with a concave relay reflector positioned inside the lens/eye cavity may be used for reflecting displays of film, LEDs, fiber optics, CRT or electronic images generated for delivering data to a wearer as a virtual image at infinity.

U.S. Pat. No. 6,065,832 for "Eyeglasses With Integrated Rear View Mirrors" which issued to Robert J. Fuziak on May 23, 2000, describes a pair of eyeglasses including rear view mirrors, each having a mirror surface that may be folded forwardly and outwardly to an open position for use, and that may also be folded rearwardly and inwardly to a closed position for retention by the temple members of the eyeglasses when not in use, such that when in the closed position against the temple members, the eyeglasses present the appearance of conventional eyeglasses.

Accordingly, it is an object of the present invention to provide eyeglasses suitable for viewing video signals, while maintaining the appearance and function of ordinary eyewear.

It is another object of the invention to provide eyeglasses suitable for viewing video signals and having independently adjustable distances between the viewing screens and a viewer's eyes, while maintaining the appearance and function of ordinary eyewear.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention as embodied and broadly described herein, the video display integrally combined with a pair of eyeglasses, hereof, includes in combination: a rearwardly curved frame having left and right temple extension portions extending rearwardly at left and right sides thereof, a top edge and a bottom edge; left and right lenses fixedly mounted within the frame; left and right temple members each temple member having an indentation on an outer surface thereof; first means for hingedly attaching the left temple member to the left temple extension portion of the frame, and second means for hingedly attaching the right temple member to the right temple extension portion of the frame; first and second pivots correspondingly disposed on the top edge and the bottom edge of the frame, respectively, forwardly from the first attachment means and in the vicinity of the left side of the frame; third and fourth pivots correspondingly disposed on the top edge and the bottom edge of the frame, respectively, forwardly from the second attachment means and in the vicinity of the right side of the frame; a first video display holder having a top edge and a bottom edge, and a second video display holder having a top edge and a bottom edge, the first holder and the second holder each of the holders having a surface facing the frame comprising a first video display and a second video display, respectively; fifth and sixth pivots correspondingly disposed on the top edge and on the bottom edge of the first holder, respectively, in the vicinity of one end thereof; seventh and eight pivots correspondingly disposed on the top edge and on the bottom edge of the second holder, respectively, in the vicinity of one end thereof; first and second telescoping arms each of the arms having one end thereof pivotably attached to one of the first and second pivots, respectively, and the opposite end thereof attached to the fifth pivot and sixth pivot, respectively; third and fourth telescoping arms each having one end thereof pivotably attached to one of the third and fourth pivots, respectively, and the opposite end thereof attached to the seventh pivot and the eighth pivot, respectively, and means for driving the first video display and the second video display, whereby the first video display and the second video display can be disposed in front of the left lens and the right lens, respectively, or disposed in the indentation on the outer side of the left temple member or the right temple member, respectively.

In another aspect of the present invention and in accordance with its objects and purposes, the video display integrally combined with a pair of eyeglasses, hereof, includes in combination: a rearwardly curved frame having left and right temple extension portions extending rearwardly at left and right sides thereof, a top edge and a bottom edge; left and right lenses fixedly mounted within the frame; left and right temple members each of the temple members having an indentation on an outer surface thereof; first means for pivotably attaching the left temple member to the left temple extension portion of the frame, and second means for pivotably attaching the right temple member to the right temple extension portion of the frame; a first pivot and a second pivot correspondingly disposed in line with the first attachment means; a third pivot and a fourth pivot correspondingly disposed in line with the second attachment means; a first video display holder having a top edge and a bottom edge, and a second video display holder having a top edge and a bottom edge, the first holder and the second holder each having a surface facing said frame comprising a first video display and a second video display; a fifth pivot and a sixth pivot correspondingly disposed on the top edge and on the bottom edge of the first holder, respectively, in the vicinity of one end thereof; a seventh pivot and an eighth pivot correspondingly disposed on the top edge and on the bottom edge of the second holder, respectively, in the vicinity of one end thereof; a first and a second telescoping arm, each of the telescoping arms having one end thereof pivotably attached to one of the first pivot and the second pivot, respectively, and the opposite end thereof attached to the fifth pivot and the sixth pivot, respectively; a third and a fourth telescoping arm, each of the telescoping arms having one end thereof pivotably attached to one of the third pivot and fourth pivot, respectively, and the opposite end thereof attached to the seventh pivot and the eighth pivot, respectively; and means for driving the first video display and the second video display, whereby the first video display and the second video display can be disposed in front of the left lens and the right lens, respectively, or be disposed in the indentation on the outer side of the left temple member or the right temple member, respectively.

In still another embodiment of the invention and in accordance with its objects and purposes, the video display integrally combined with a pair of eyeglasses, hereof, includes combination: a frame having a left side and a right side; left and right lenses fixedly mounted within the frame; left and right temple members each having an indentation on an outer surface thereof; first means for pivotably attaching the left temple member to the left of the frame, and second means for pivotably attaching right temple member to the right of the frame; a first video display holder having a top edge and a bottom edge, and a second video display holder having a top edge and a bottom edge, the first holder and the second holder each having a surface facing the frame comprising a first video display and a second video display; a first and a second telescoping arm, each telescoping arm having one end thereof pivotably attached to the first holder in the vicinity of one of the top edge or the bottom edge thereof, and the other end thereof pivotably attached to the frame in line with the first means; a third and a fourth telescoping arm, each telescoping arm having one end thereof pivotably attached to the second holder in the vicinity of one of the top edge or the bottom edge thereof, and the other end thereof pivotably attached to the frame in line with the second means; and means for driving the first video display and the second video display, whereby the first video display and the second video display can be disposed in front of the left lens and the right lens, respectively, or be disposed in the indentation on the outer side of the left temple member or the right temple member, respectively.

Benefits and advantages of the present invention include, but are not limited to, an integrated eyeglass system which can be used to view video displays through the lenses thereof while appearing and functioning like ordinary eyewear when the displays are pivoted out of the way of the lenses.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Briefly, the present invention includes eyeglasses useful for viewing video signals, while maintaining the appearance and function of ordinary eyewear. By using pivoted telescoping arms upon which viewing screens are disposed, the video signals may be viewed at independently adjustable distances from a viewer's eyes. Two pivoted mounting locations for the telescoping arms are described, one on the frame itself, and one in the vicinity of the pivots for the earpieces. Electronics such as video receivers and amplifiers, audio receivers and amplifiers, Blue Tooth components, and earphones, as examples, for driving and complementing the video displays, power supplies, such as batteries, and electrical connections among the various components may be mounted on and/or in the eyeglasses, be plugged into the eyeglasses and worn on the body of the user of the eyeglasses, or be used in various combinations thereof as is suitable for the intended applications in ways known to those having skill in the audio/video arts.

Figure 1A:
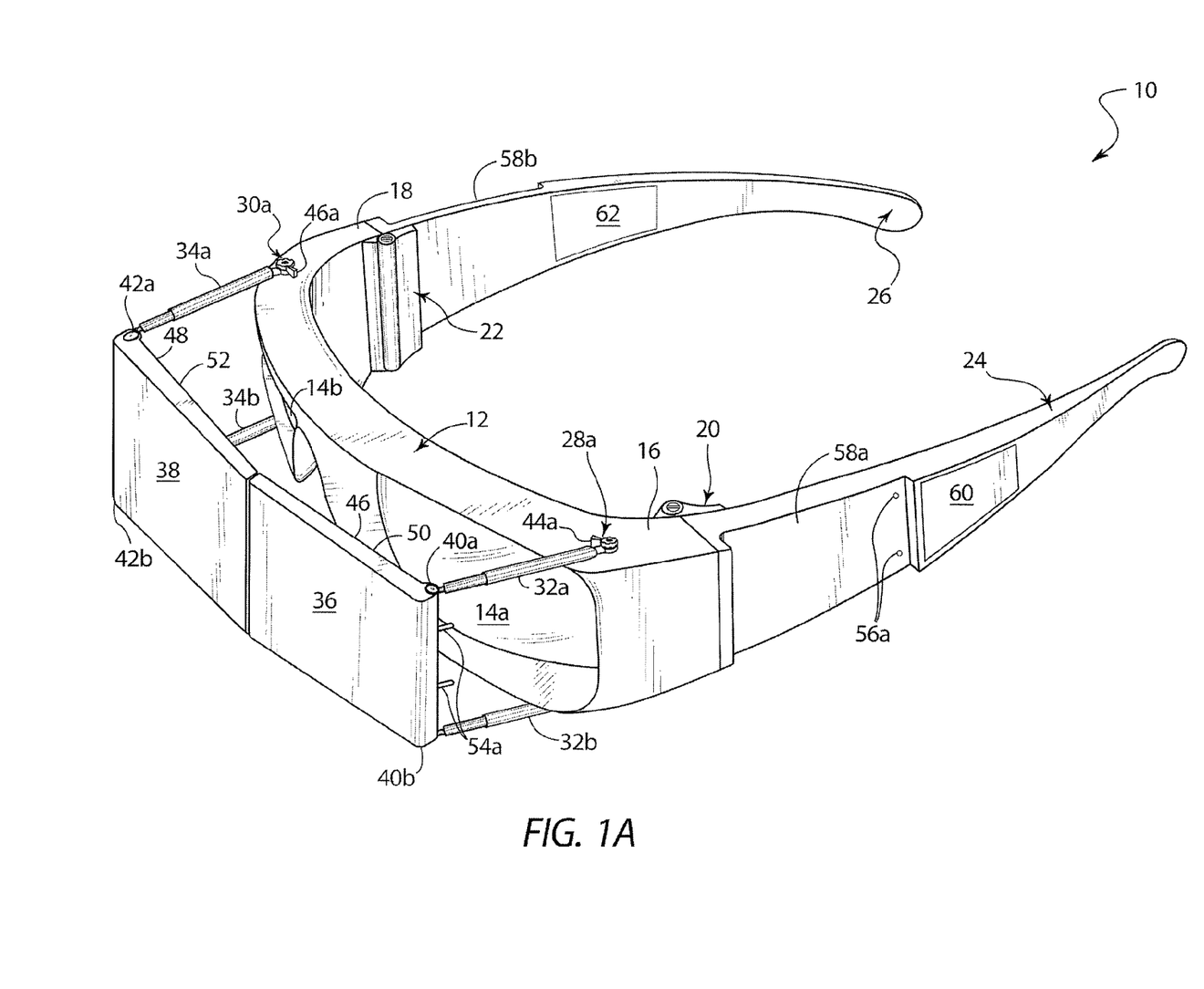
FIG. 1A is a schematic representation of an embodiment of the eyeglasses of the present invention, wherein the telescoping arms supporting video displays are shown attached to the top and bottom of the frame of the eyeglasses in their deployed positions.

Reference will now be made in detail to the present preferred embodiments of the inventions, examples of which are illustrated in the accompanying drawings. In the Figures, similar or identical structure will be identified using identical callouts. Turning now to FIG. 1A, eyeglasses, 10, having rearwardly curved frame member, 12, for retaining conventional lenses, 14a and 14b, which may be prescription lenses, sun-protection lenses, and the like. Frame member 12 includes temple extension portions, 16 and 18, extending outwardly and rearwardly at the left and right sides thereof, respectively. Each of the temple extension portions 16 and 18 of frame member 12 includes temple member hinges, 20 and 22, respectively, by which left and right temple members or earpieces, 24 and 26, are hingedly attached to frame member 12. Located forwardly from the temple hinges 20 and 22 on frame 12 are first left and right upper pivots, 28a and 30a. Two first lower pivots, 28b and 30b (not shown in FIG. 1A) are located along the bottom edge of frame member 12 in corresponding locations to upper pivots 28a and 30a.

Left upper and lower telescoping arms, 32a and 32b, respectively, and right upper and lower telescoping arms, 34a and 34b, respectively, are pivotably attached to first left and right upper pivots 28a and 30a, respectively, and corresponding first lower pivots 28b and 30b, respectively, to pivotably support video display holders, 36 and 38, respectively, by means of second right and left upper pivots 40a and 42a, respectively, and second right and left lower pivots, 40b and 42b, respectively. Telescoping arms 32a, 32b, 34a, and 34b may be fabricated from metals such as aluminum or titanium, as examples, or from plastic materials, and may contain locking mechanisms (not shown in FIG. 1A) to more firmly position video display holders 36 and 38. First right and left pivots 28a and 30a are shown in FIG. 1A as having locking mechanisms, 44a and 46a, respectively, such that telescoping arms 32a and 34a may be fixed in a chosen orientation. Lower pivots 28b and 30b may also have locking mechanisms, as may second pivots 40a, 40b, 42a, and 42b.

Inner surfaces, 46 and 48, of each of left and video display holders 36 and 38, respectively, include a video display, 50 and 52, respectively, that are conventionally bonded thereto. Each of video displays 50 and 52 may have a surface area that is approximately equal to the surface area of each of the eyeglass lenses 14a and 14b. Video displays 50 and 52 may be liquid crystal displays, organic semiconductor displays or nanotube-based displays, as examples.

Each of the video display holders 36 and 38 further includes at least one cylindrical protrusion, 54a and 54b (not shown in FIG. 1A) disposed on the inner surfaces 46 and 48, respectively, thereof at the end closest to second pivots 40a and 42a, respectively. At least one indentation, 56a and 56b (not shown in FIG. 1A), adapted to receive the at least one protrusion 54a and 54b, respectively, is provided on the outer surface of each of temple members 24 and 26, respectively, for engaging the at least one protrusion 54 when each of the telescopic arms is collapsed, and each of the video holders 36 and 38 is pivoted rearwardly into its retracted or storage position in indentations or depressions, 58a and 58b, in temple members 24 and 26, respectively, adapted to receive video assemblies 36 and 38 and telescoping arms 32a and 32b, and 34a and 34b, respectively. Display holders 36 and 38 are thereby retained in their respective retracted positions, and eyeglasses 10 have the appearance of ordinary eyewear. It should be mentioned that display holders 36 and 38 may have a convex appearance when viewed from the sides thereof opposite displays 50 and 52, in order to fit the curvature of earpieces 24 and 26, if these temple members have significant curvature.

Electronic components, power sources, and electrical connections therebetween may be housed in compartments, 60 and 62, depending on the thickness of temple members 24 and 26, respectively, and the size of the desired components. Also, depending on the thickness of temple members 24 and 26, compartments may be formed in indentations 58a and 58b, respectively. Frame 12 may be used to provide additional storage as well. In other embodiments of the invention, receptacles may be provided in compartments 60 and 62 for placing electronic components and power sources in electrical communication with video displays 50 and 52, respectively. Electrical connections among components would be made depending on the types of components and power sources employed, and would be understood by those having skill in the audio and video arts.

Figure 1B:
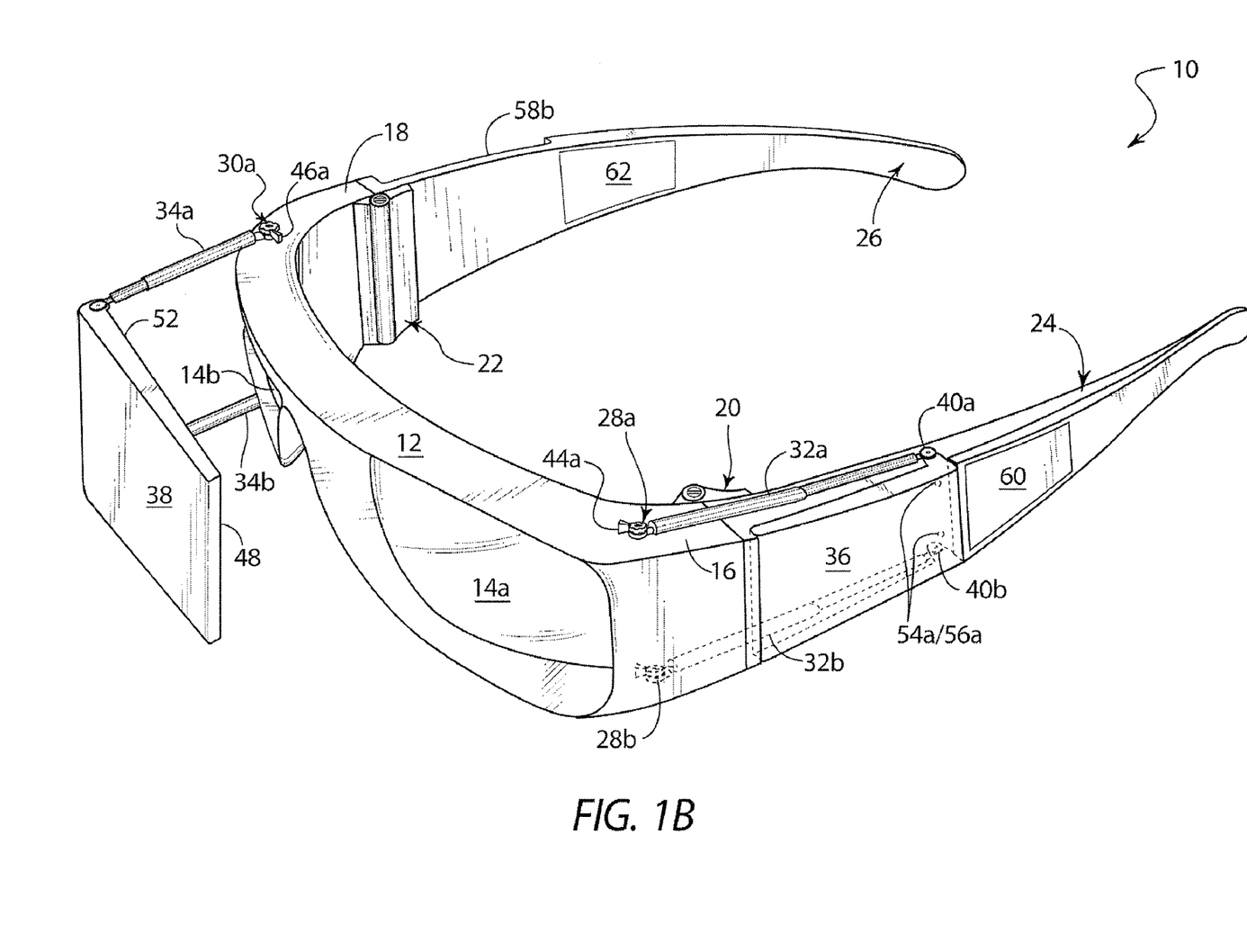
FIG. 1B is a schematic representation of the eyeglasses shown in FIG. 1A hereof illustrating the left video display holder in its storage position.
Figure 1C:
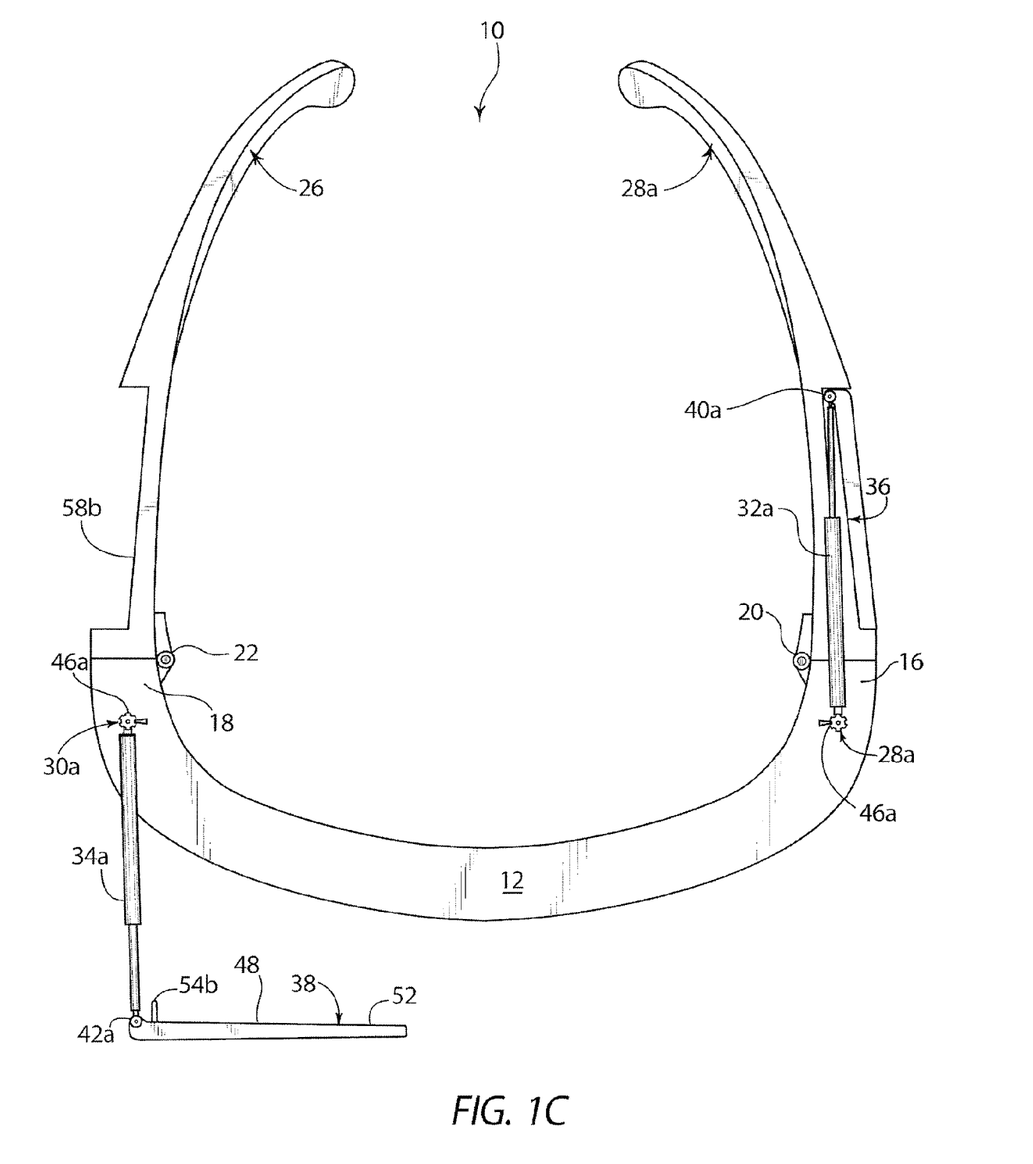
FIG. 1C is a schematic representation of a top view of the eyeglasses shown in FIG. 1B hereof.

FIG. 1B is a schematic representation of the embodiment of the invention shown in FIG. 1A hereof, wherein the left video assembly has been pivoted and the left telescoping arms have been pivoted and collapsed into a storage configuration, while the right assembly remains deployed. FIG. 1C is a schematic representation of a top view of the embodiment of the present invention shown in FIG. 1B hereof.

In use, the video display assemblies 36 and 38 are pivoted forwardly into the positions illustrated in FIG. 1A such that the wearer of eyeglasses 10 may view video displays 50 and 52. When not in use, video assemblies 36 and 38 may be quickly and easily pivoted rearwardly, as illustrated with video display assembly 36 in FIGS. 1B and 1C, wherein the displays may be disposed against temple members 24 and 26, and are retained in that position by the snapping engagement of at least one protrusion 54a and at least one mating indentation 56a. Electrical connections might be removed and stored as appropriate.

Figure 2A:
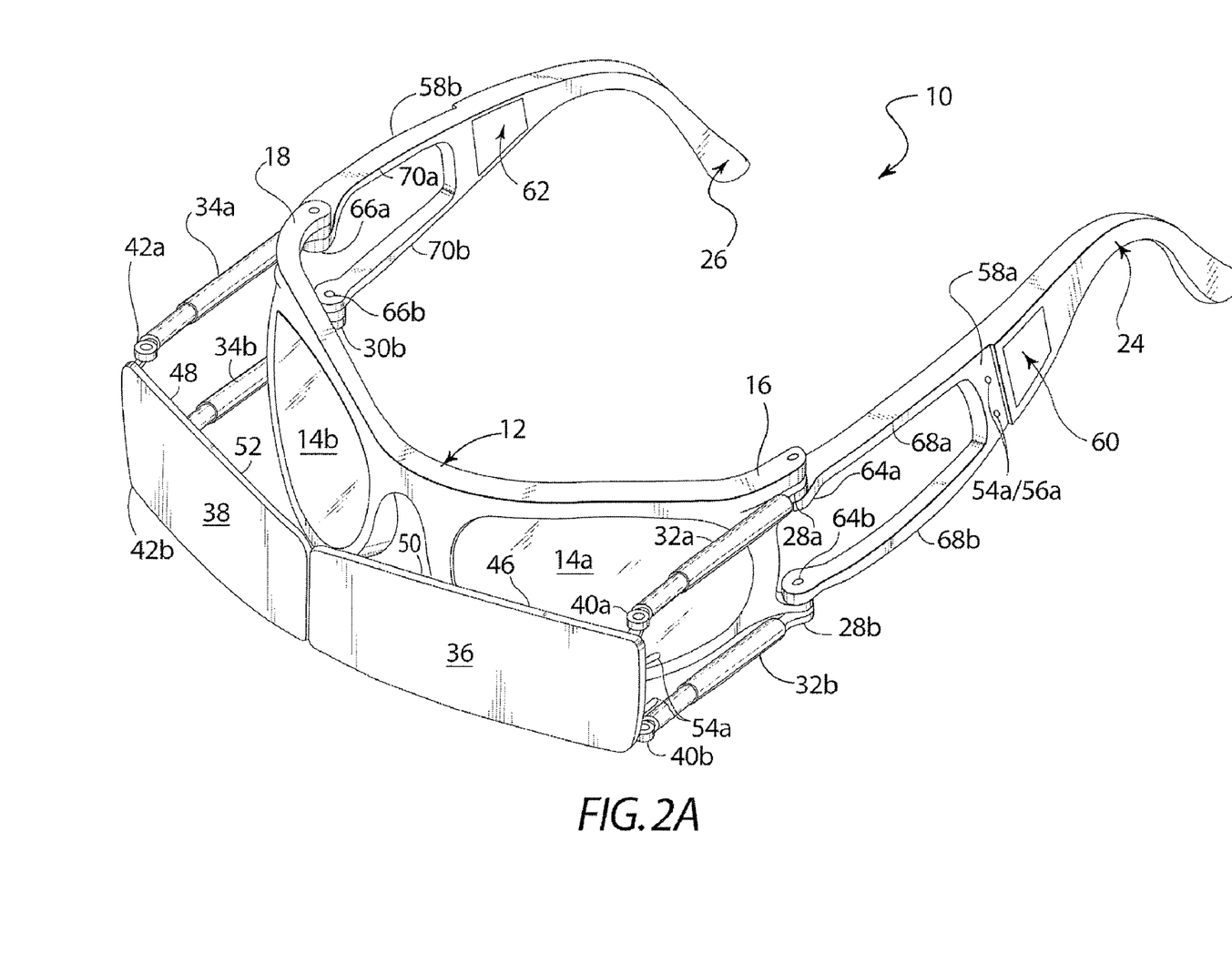
FIG. 2A is a schematic representation of an embodiment of the eyeglasses of the present invention, wherein the telescoping arms supporting video displays are shown attached to the frame of the eyeglasses in the region of pivotal attachment of the earpieces thereof and in their deployed positions.

FIG. 2A is a schematic representation of an embodiment of eyeglasses 10 of the present invention, wherein right and left, and upper and lower telescoping arms 32a and 34a, and 32b and 34b, respectively, are pivotably attached (28a and 30a, and 28b and 30b) to frame 12 in the region of right and left and upper and lower pivots, 64a and 66a, and 64b and 66b, of earpieces or temple members 24 and 26, respectively, and may use the same pivot pins therefor. Earpieces 24 and 26 are shown as having upper and lower forked members, 68a and 68b, and 70a and 70b, respectively, to reduce the weight of eyeglasses 10, although this may effectively eliminate electronics storage in indentations 58a and 58b, respectively. Video display assemblies 36 and 38 are shown in their deployed positions, being pivotably attached to telescoping arms 32a, 32b, 34a, and 34b at pivots 40a, 40b, 42a, and 42b, respectively.

Inner surfaces, 46 and 48, of each of left and video display holders 36 and 38, respectively, include video display, 50 and 52, respectively, that are conventionally bonded thereto. Each of video displays 50 and 52 may have a surface area that is approximately equal to the surface area of each of the eyeglass lenses 14a and 14b. Video displays 50 and 52 may be liquid crystal displays, organic semiconductor displays or nanotube-based displays, as examples.

Each of the video display holders 36 and 38 further includes at least one cylindrical protrusion, 54a and 54b (not shown in FIG. 2A) disposed on the inner surfaces 46 and 48, respectively, thereof at the end closest to second pivots 40a and 42a, respectively. At least one indentation, 56a and 56b (not shown in FIG. 2A), adapted to receive the at least one protrusion 54a and 54b, respectively, is provided on the outer surface of each of temple members 24 and 26, respectively, for engaging the at least one protrusion 54 when each of the display holders 36 and 38 is pivoted rearwardly into its retracted or storage position in indentations or depressions, 58a and 58b, in temple members 24 and 26, respectively, adapted to receive video holders 36 and 38 and telescoping arms 32a and 32b, and 34a and 34b, respectively. Display holders 36 and 38 are thereby retained in their respective retracted positions, and eyeglasses 10 have the appearance of ordinary eyewear. It should again be mentioned that display holders 36 and 38 may have a convex appearance when viewed from the sides thereof opposite displays 50 and 52, in order to fit the curvature of earpieces 24 and 26, if these temple members have significant curvature.

Figure 2B:
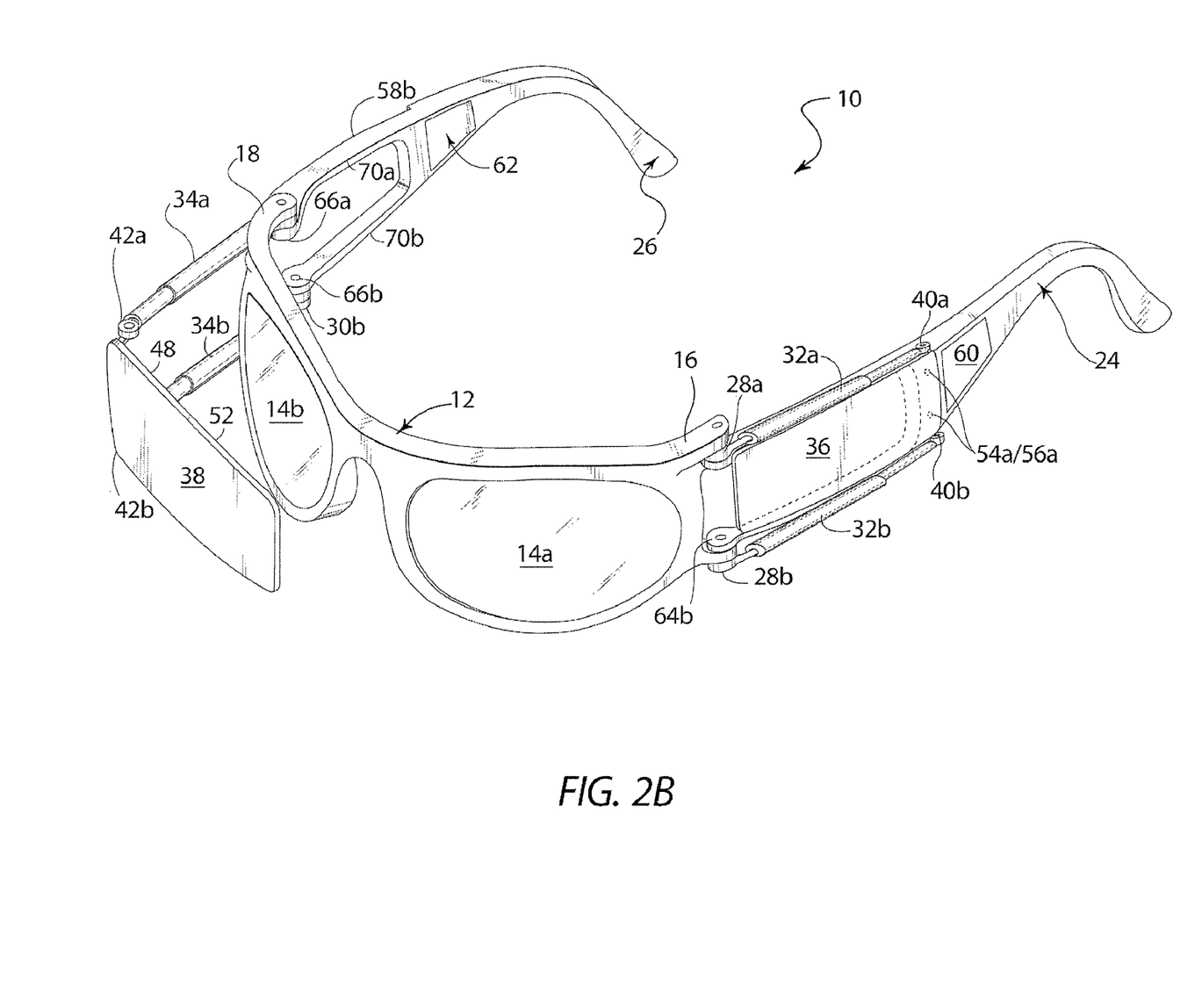
FIG. 2B is a schematic representation of the eyeglasses shown in FIG. 2A hereof illustrating the left video display holder its storage position.
Figure 2C:
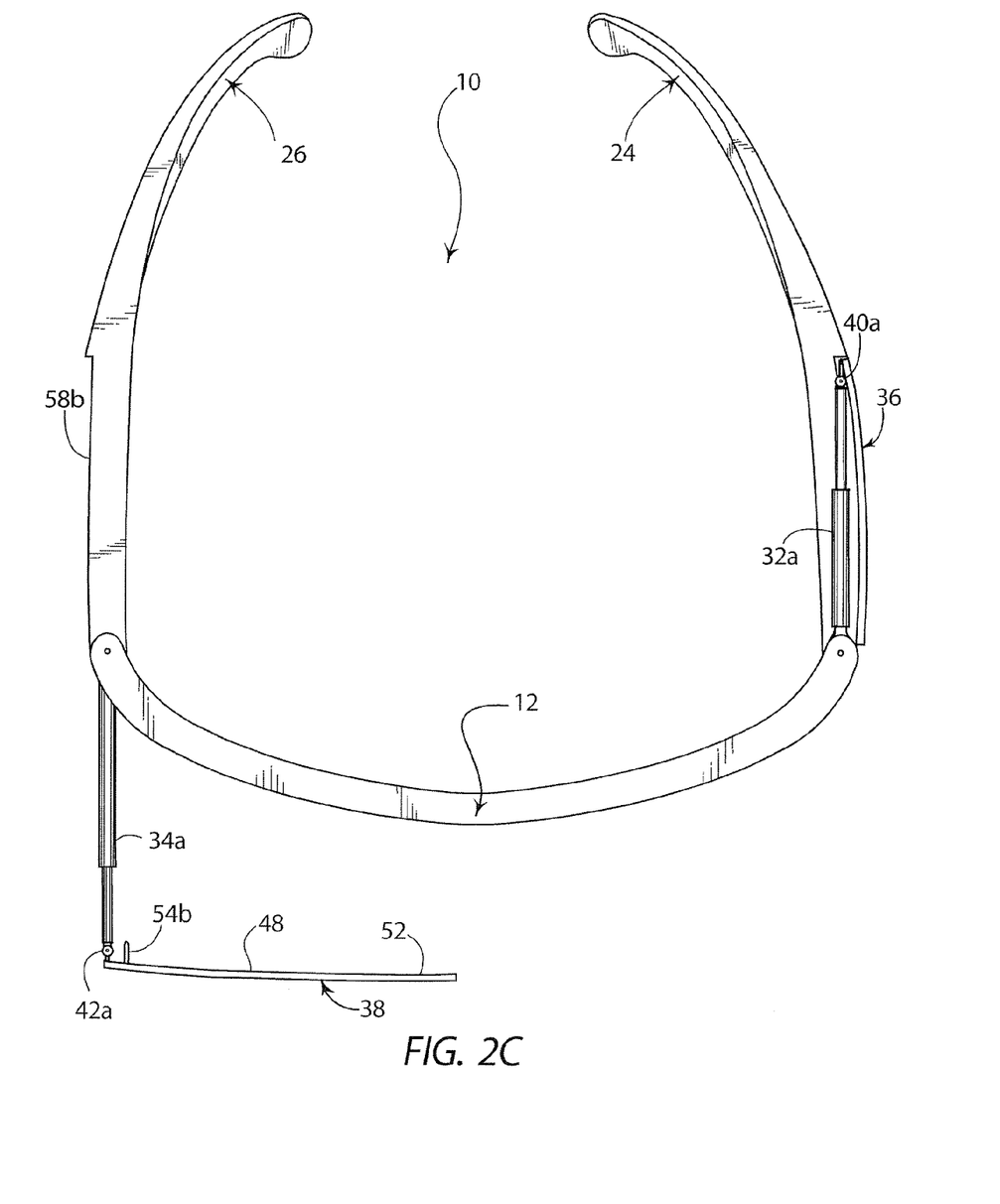
FIG. 2C is a schematic representation of a top view of the eyeglasses shown in FIG. 2B hereof.

FIG. 2B is a schematic representation of eyeglasses 10 shown in FIG. 2A hereof illustrating left display holder 36 having been pivoted and left telescoping arms 32a and 32b having been pivoted and collapsed into a storage configuration, wherein the telescoping arms are disposed between temple member 24 and video display assembly 36, while right display holder 38 remains deployed, and FIG. 2C is a schematic representation of a top view of eyeglasses 10 shown in FIG. 2B hereof. It should be mentioned that video display assembly 36 resides inside upper and lower telescoping arms 32a and 32b, respectively, when in its stored position.

Figure 3A:
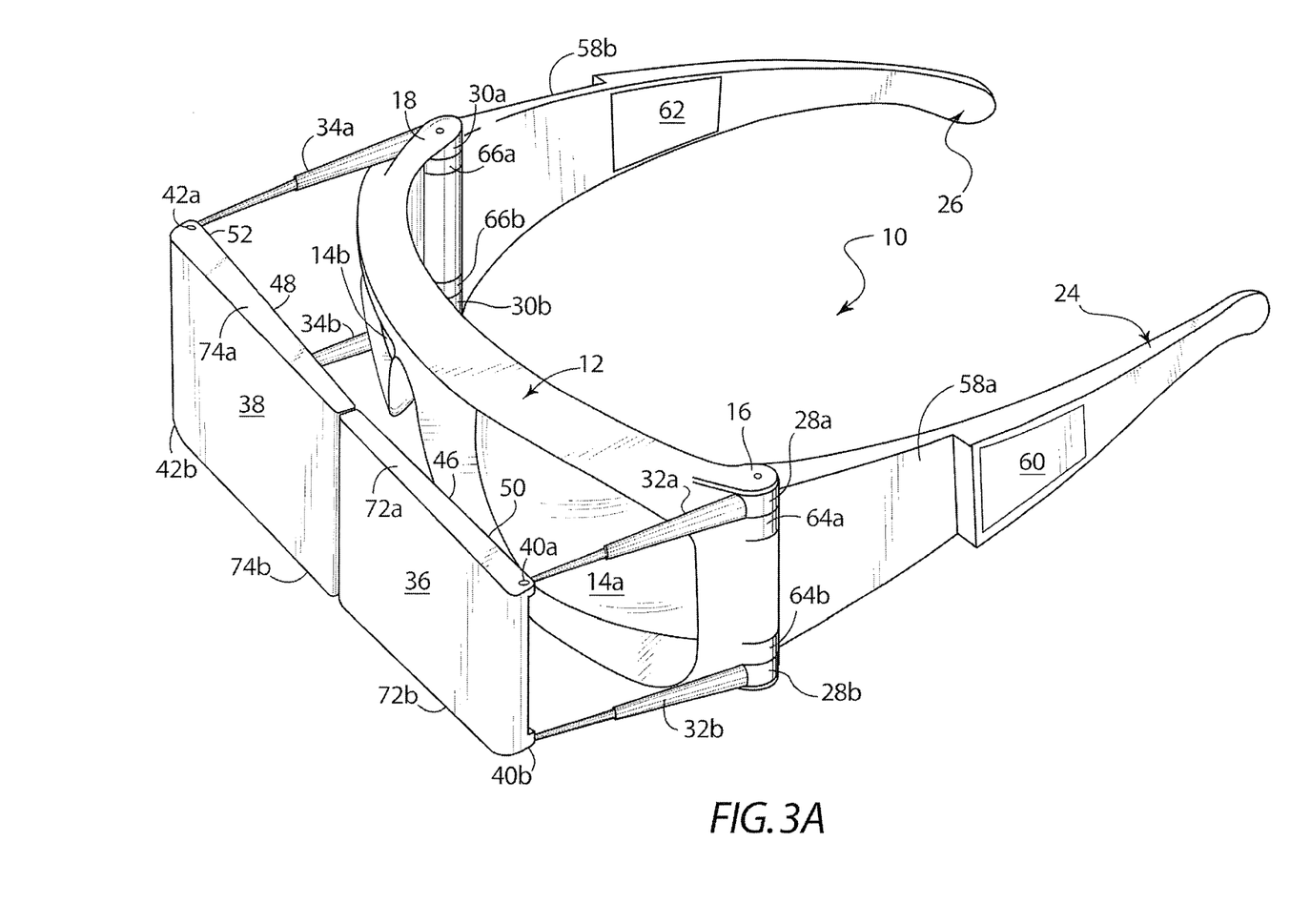
FIG. 3A is a schematic representation of another embodiment of the eyeglasses of the present invention, wherein the telescoping arms supporting video displays are shown attached to the frame of the eyeglasses in the region of pivotal attachment of the earpieces thereof and in their deployed positions.

FIG. 3A is a schematic representation of another embodiment of eyeglasses 10 of the present invention, wherein right and left, and upper and lower telescoping arms 32a and 34a, and 32b and 34b, respectively, are pivotably attached (28a and 30a, and 28b and 30b) to frame 12 in the region of right and left and upper and lower pivots, 64a and 66a, and 64b and 66b, of earpieces or temple members 24 and 26, respectively, and may use the same pivot pins therefor. Display holders 36 and 38 are shown in their deployed positions, being pivotably attached to telescoping arms 32a, 32b, 34a, and 34b at pivots 40a, 40b, 42a, and 42b.

Inner surfaces, 46 and 48, of each of left and display holders 36 and 38, respectively, include a video display, 50 and 52, respectively, that are conventionally bonded thereto. Each of video displays 50 and 52 may have a surface area that is approximately equal to the surface area of each of the eyeglass lenses 14a and 14b. Video displays 50 and 52 may be liquid crystal displays, organic semiconductor displays or nanotube-based displays, as examples.

Each of display holders 36 and 38 is formed such that inwardly facing (toward frame 12) upper lip portions, 72a and 74a, respectively, and corresponding lower lip portions, 72b and 74b (not shown in FIG. 3A), respectively, are formed across the top and bottom thereof, respectively, for engaging telescoping arms 32a and 34a, and 32b and 34b, respectively, when each of the display holders 36 and 38 is pivoted rearwardly into its retracted or storage position in indentations or depressions, 58a and 58b, in temple members 24 and 26, respectively, adapted to receive display holders 36 and 38 and telescoping arms 32a and 32b, and 34a and 34b, respectively. Display holders 36 and 38 are thereby retained in their respective retracted positions, and eyeglasses 10 have the appearance of ordinary eyewear; that is, in this embodiment, the telescoping arms are not visible. It should again be mentioned that display holders 36 and 38 may have a convex appearance when viewed from the sides thereof opposite displays 50 and 52, in order to fit the curvature of earpieces 24 and 26, if these temple members have significant curvature.

Figure 3B:
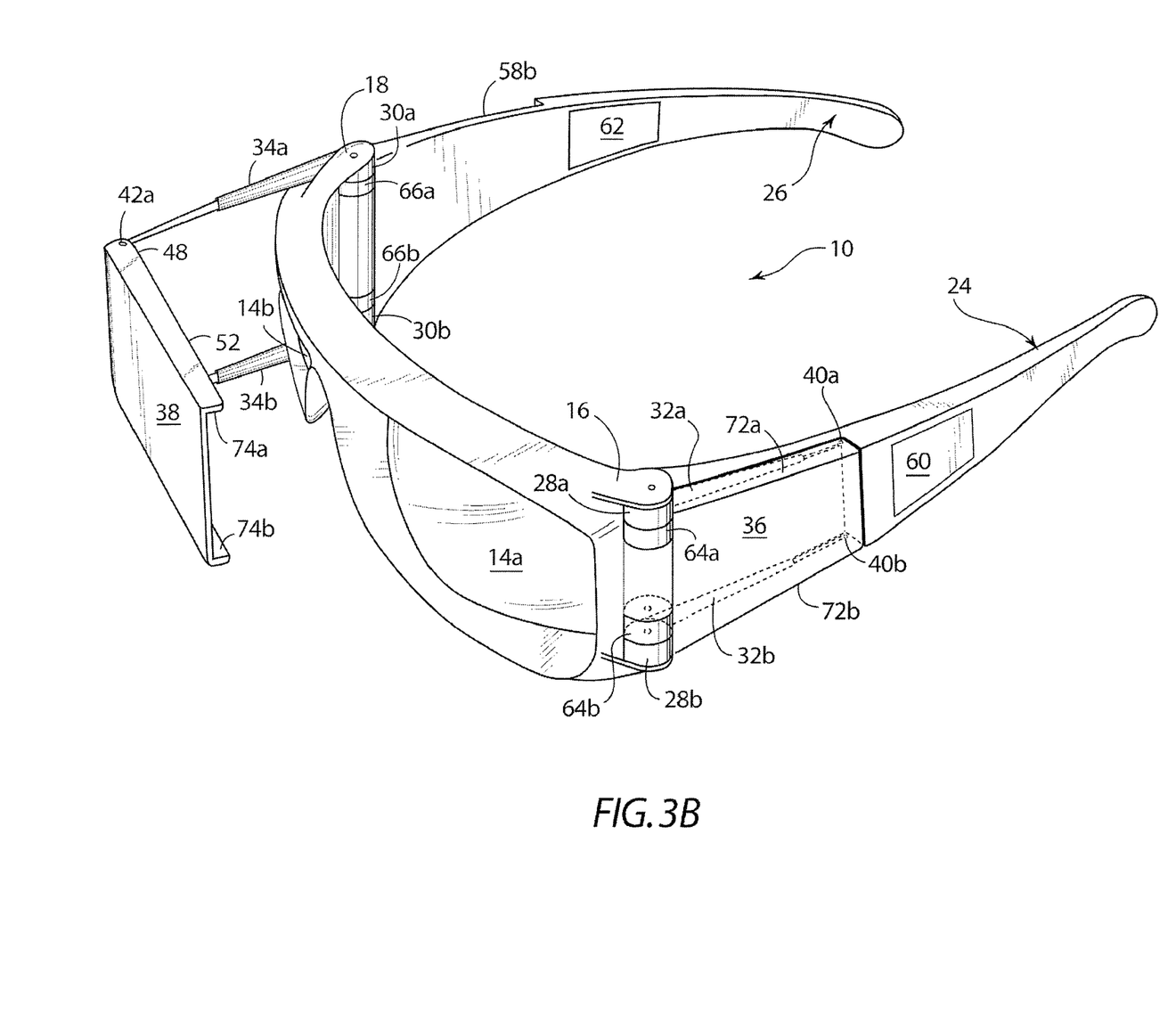
FIG. 3B is a schematic representation of the eyeglasses shown in FIG. 3A hereof illustrating the left video display holder in its storage position, the video display holder having inwardly facing lip portions top and bottom to more completely conceal and hold the telescoping arms.
Figure 3C:
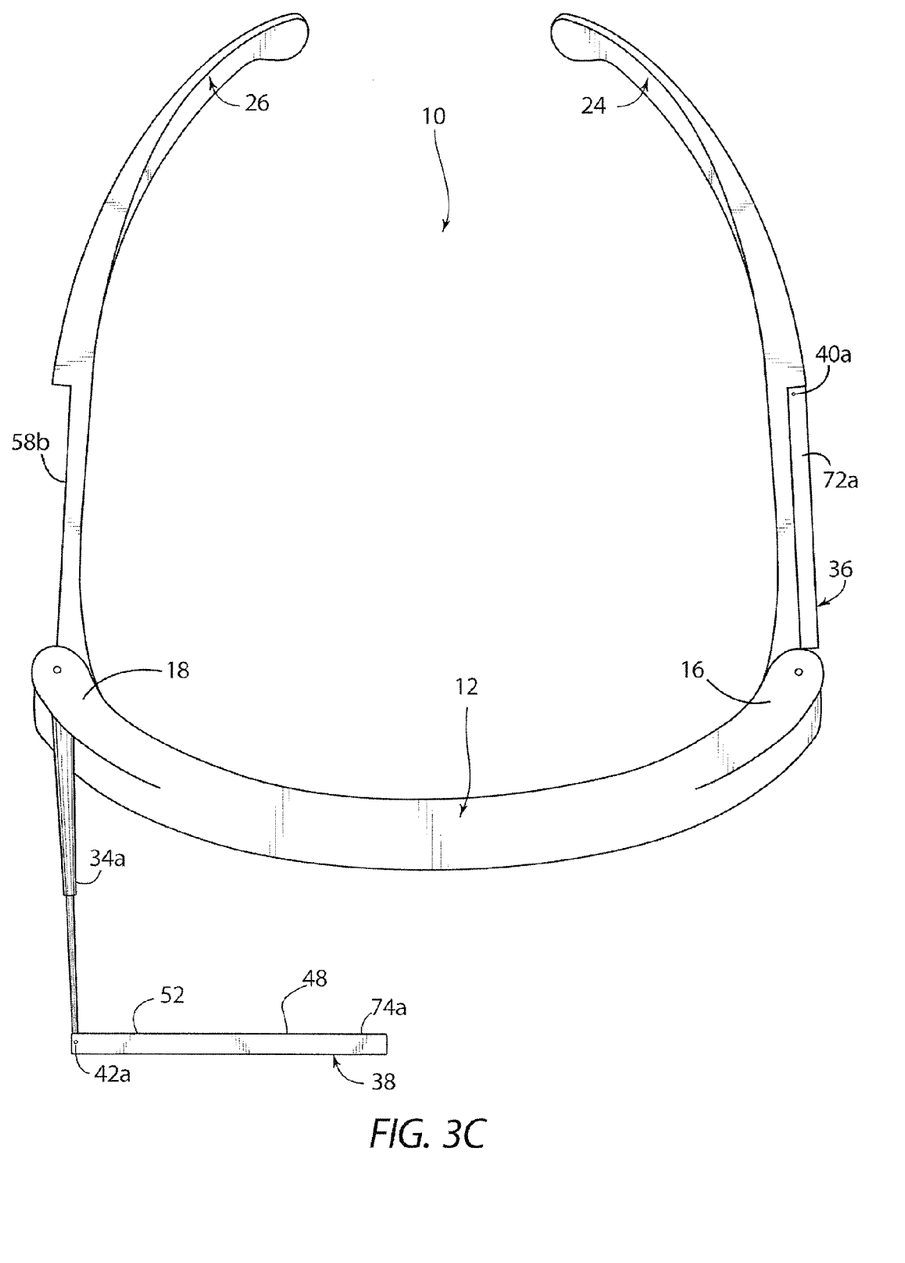
FIG. 3C is a schematic representation of a top view of the eyeglasses shown in FIG. 3B hereof.

FIG. 3B is a schematic representation of eyeglasses 10 shown in FIG. 3A hereof illustrating left video display assembly 36 in its storage position, with telescoping arms 32a and 32b having been pivoted and collapsed such that they are disposed between the video display assembly and earpiece 24, the video display assemblies having inwardly facing top lip portions 72a and 74a, and corresponding bottom lip portions 72b and 74b for engaging and more completely concealing telescoping arms 32a and 32b, thereby holding the video display assemblies in place in their retracted locations. FIG. 3C is a schematic representation of a top view of eyeglasses 10 shown in FIG. 3B hereof.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A video display integrally combined with a pair of eyeglasses, comprising in combination:

a rearwardly curved frame having left and right temple extension portions extending rearwardly at left and right sides thereof, a top edge and a bottom edge;

left and right lenses fixedly mounted within said frame;

left and right temple members each having an indentation on an outer surface thereof;

first means for hingedly attaching said left temple member to the left temple extension portion of said frame, and second means for hingedly attaching said right temple member to the right temple extension portion of said frame;

first and second pivots correspondingly disposed on the top edge and the bottom edge of said frame, respectively, forwardly from said first attachment means and in the vicinity of the left side of said frame;

third and fourth pivots correspondingly disposed on the top edge and the bottom edge of said frame, respectively, forwardly from said second attachment means and in the vicinity of the right side of said frame;

a first video display holder having a top edge and a bottom edge, and a second video display holder having a top edge and a bottom edge, said first holder and said second holder each having a surface facing said frame comprising a first video display and a second video display;

fifth and sixth pivots correspondingly disposed on the top edge and on the bottom edge of said first assembly, respectively in the vicinity of one end thereof;

seventh and eighth pivots correspondingly disposed on the top edge and on the bottom edge of said second assembly, respectively in the vicinity of one end thereof;

first and second telescoping arms each of said telescoping arms having one end thereof pivotably attached to one of said first and second pivots, respectively, and the opposite end thereof attached to said fifth pivot and said sixth pivot, respectively;

third and fourth telescoping arms each of said telescoping arms having one end thereof pivotably attached to one of said third and fourth pivots, respectively, and the opposite end thereof attached to said seventh pivot and said eighth pivot, respectively; and means for driving said first video display and said second video display, whereby said first video display of said first holder and said second video display of said second holder can be disposed in front of said left lens and right lens, respectively, or disposed in the indentation on the outer side of said left temple member or said right temple member, respectively.

2. The video display of claim 1, further comprising at least one first protrusion disposed on the inner surface of said first holder at the end thereof in the vicinity of said fifth and sixth pivots, at least one second protrusion disposed on the inner surface of said second assembly at the end thereof in the vicinity of said seventh and eighth pivots, at least one mating hole correspondingly positioned in the indentation of said left temple member for receiving and engaging said at least one first protrusion, and at least one mating hole correspondingly positioned in the indentation of said right temple member for receiving and engaging said at least one second protrusion; whereby when each of said holders is folded rearwardly into a retracted position in its respective indentation, said holder is snappingly engaged in that position.

3. The video display of claim 1, wherein said first, second, third, and fourth pivots further comprise locking pivots.

4. The video display of claim 1, wherein said means for driving said first video display and said second video display comprises a video receiver, a video amplifier, means for controlling said video receiver and said video amplifier, and a power source suitable for powering said video receiver, said video amplifier and said controlling means.

5. The video display of claim 4, wherein said video receiver, said video amplifier, said controlling means, and said power supply are disposed in said frame, said right temple member and said left temple member.

6. The video display of claim 1, wherein said left lens and said right lens each have a surface area which is approximately the same, and said first video display and said second video display each have a surface area which is approximately the same, and wherein the surface area of said lenses is approximately equal to the surface area of said video displays.

7. A video display integrally combined with a pair of eyeglasses, comprising in combination:
- a rearwardly curved frame having left and right temple extension portions extending rearwardly at left and right sides thereof, a top edge and a bottom edge;
- left and right lenses fixedly mounted within said frame;
- left and right temple members each having an indentation on an outer surface thereof;
- first means for pivotably attaching said left temple member to the left temple extension portion of said frame, and second means for pivotably attaching said right temple member to the right temple extension portion of said frame;
- a first pivot and a second pivot correspondingly disposed in line with said first attachment means;
- a third pivot and a fourth pivot correspondingly disposed in line with said second attachment means;
- a first video display holder having a top edge and a bottom edge, and a second video display holder having a top edge and a bottom edge, each of said first holder and said second holder having a surface facing said frame comprising a first video display and a second video display, respectively;
- a fifth pivot and a sixth pivot correspondingly disposed on the top edge and on the bottom edge of said first holder, respectively in the vicinity of one end thereof;
- a seventh pivot and an eighth pivot correspondingly disposed on the top edge and on the bottom edge of said second holder, respectively in the vicinity of one end thereof;
- a first and a second telescoping arm, each of said telescoping arms having one end thereof pivotably attached to one of said first pivot and said second pivots, respectively, and the opposite end thereof attached to said fifth pivot and said sixth pivot, respectively;
- a third and a fourth telescoping arm, each of said telescoping arms having one end thereof pivotably attached to one of said third pivot and fourth pivots, respectively, and the opposite end thereof attached to said seventh pivot and said eighth pivot, respectively; and
- means for driving said first video display and said second video display, whereby said first video display and said second video display can be disposed in front of said left lens and said right lens, respectively, or be disposed in the indentation on the outer side of said left temple member or said right temple member, respectively.

8. The video display of claim 7, wherein said first display holder and said second display holder further comprise upper lip portions formed along the top edge thereof and facing said frame, and corresponding lower lip portions formed along the bottom edge thereof and facing said frame, for engaging upper and lower telescoping arms when each of said display holders is pivoted rearwardly and said telescoping arms are collapsed into its storage position.

9. The video display of claim 7, further comprising at least one first protrusion disposed on the inner surface of said first display holder at the end thereof in the vicinity of said fifth and sixth pivots, at least one second protrusion disposed on the inner surface of said second display holder at the end thereof in the vicinity of said seventh and eighth pivots, at least one mating hole correspondingly positioned in the indentation of said left temple member for receiving and engaging said at least one first protrusion, and at least one mating hole correspondingly positioned in the indentation of said right temple member for receiving and engaging said at least one second protrusion; whereby when each of said holders is folded rearwardly into a retracted position in its respective indentation, said holder is snappingly engaged in that position.

10. The video display of claim 7, wherein said means for driving said first video display and said second video display comprises a video receiver, a video amplifier, and means for controlling said video receiver and said video amplifier, and a power supply suitable for powering said video receiver, said video amplifier and said controlling means.

11. The video display of claim 10, wherein said video receiver, said video amplifier, said controlling means, and said power supply are disposed in said frame, said right temple member and said left temple member.

12. The video display of claim 7, wherein said left lens and said right lens each have a surface area which is approximately the same, and said first video display and said second video display each have a surface area which is approximately the same, and wherein the surface area of said lenses is approximately equal to the surface area of said video displays.

13. A video display integrally combined with a pair of eyeglasses, comprising in combination:
- a frame having a left side and a right side;
- left and right lenses fixedly mounted within said frame;
- left and right temple members each having an indentation on an outer surface thereof;
- first means for pivotably attaching said left temple member to the left of said frame, and second means for pivotably attaching said right temple member to the right of said frame;
- a first video display holder having a top edge and a bottom edge, and a second video display holder having a top edge and a bottom edge, said first holder and said second holder each having a surface facing said frame comprising a first video display and a second video display;
- a first and a second telescoping arm, each of said telescoping arms having one end thereof pivotably attached to said first video display in the vicinity of one of the top edge or the bottom edge thereof, and the other end thereof pivotably attached to said frame in line with said first means;
- a third and a fourth telescoping arm, each of said telescoping arms having one end thereof pivotably attached to said second video display in the vicinity of one of the top edge or the bottom edge thereof, and the other end thereof pivotably attached to said one of said frame in line with said second means; and
- means for driving said first video display and said second video display, whereby said first video display and said second video display can be disposed in front of said left lens and said right lens, respectively, or be disposed in the indentation on the outer side of said left temple member or said right temple member, respectively.

14. The video display of claim 13, wherein said first display holder and said second display holder further comprise upper lip portions formed along the top edge thereof and facing said frame, and corresponding lower lip portions formed along the bottom edge thereof and facing said frame, for engaging upper and lower telescoping arms when each of said display holders is pivoted rearwardly and said telescoping arms are collapsed into its storage position.

15. The video display of claim 13, further comprising at least one first protrusion disposed on the inner surface of said first display holder in the vicinity of an end thereof, at least one second protrusion disposed on the inner surface of said second display holder in the vicinity of an end thereof, at least one mating hole correspondingly positioned in the indentation of said left temple member for receiving and engaging said at least one first protrusion, and at least one mating hole correspondingly positioned in the indentation of said right temple member for receiving and engaging said at least one second protrusion; whereby when each of said display holders is folded rearwardly into a retracted position in its respective indentation, said display holder is snappingly engaged in that position.

16. The video display of claim 13, wherein said means for driving said first video display and said second video display comprises a video receiver, a video amplifier, and means for controlling said video receiver and said video amplifier, and a power supply suitable for powering said video receiver, said video amplifier and said controlling means.

17. The video display of claim 16, wherein said video receiver, said video amplifier, said controlling means, and said power supply are disposed in said frame, said right temple member and said left temple member.

18. The video display of claim 13, wherein said left lens and said right lens each have a surface area which is approximately the same, and said first video display and said second video display each have a surface area which is approximately the same, and wherein the surface area of said lenses is approximately equal to the surface area of said video displays.

19. The video display of claim 13, wherein said frame is curved in the direction of said left temple member and said right temple member.

* * * * *